(12) United States Patent
Beddar et al.

(10) Patent No.: US 9,029,760 B2
(45) Date of Patent: May 12, 2015

(54) LIQUID SCINTILLATOR FOR 3D DOSIMETRY FOR RADIOTHERAPY MODALITIES

(75) Inventors: A. Sam Beddar, Houston, TX (US);
Radhe Mohan, Houston, TX (US);
Michael Gillin, Houston, TX (US);
Louis Archambault, Quebec City (CA);
Falk Poenisch, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 196 days.

(21) Appl. No.: 13/382,483

(22) PCT Filed: Jul. 7, 2010

(86) PCT No.: PCT/US2010/041216
§ 371 (c)(1),
(2), (4) Date: Mar. 19, 2012

(87) PCT Pub. No.: WO2011/005862
PCT Pub. Date: Jan. 13, 2011

(65) Prior Publication Data
US 2012/0168630 A1    Jul. 5, 2012

Related U.S. Application Data

(60) Provisional application No. 61/223,619, filed on Jul. 7, 2009.

(51) Int. Cl.
*G12B 13/00*    (2006.01)
*G01T 1/204*    (2006.01)
*G01T 1/04*    (2006.01)

(52) U.S. Cl.
CPC .. *G01T 1/204* (2013.01); *G01T 1/04* (2013.01)

(58) Field of Classification Search
USPC ...................................... 250/252.1
See application file for complete search history.

(56) References Cited

U.S. PATENT DOCUMENTS

| | | | |
|---|---|---|---|
| 4,167,039 A | 9/1979 | Kowalsi | 364/515 |
| 5,905,263 A * | 5/1999 | Nishizawa et al. | 250/368 |
| 6,066,851 A * | 5/2000 | Madono et al. | 250/367 |
| 6,091,983 A * | 7/2000 | Alfano et al. | 600/431 |
| 6,594,336 B2 * | 7/2003 | Nishizawa et al. | 378/65 |
| 7,102,136 B2 * | 9/2006 | Fontbonne | 250/368 |

FOREIGN PATENT DOCUMENTS

| | | |
|---|---|---|
| JP | 51-088278 | 8/1976 |
| JP | 51-146884 | 12/1976 |

(Continued)

OTHER PUBLICATIONS

Miften et al., Comparison of RTP dose distributions in heterogeneous phantoms with the BEAM Monte Carlo simulation system, 2001, Journal of Applied Clinical Medical Physics, vol. 2, pp. 21-31.*

(Continued)

Primary Examiner — Christine Sung
(74) Attorney, Agent, or Firm — Parker Highlander PLLC

(57) ABSTRACT

A liquid scintillator detector for three-dimensional dosimetric measurement of a radiation beam is provided wherein a volumetric phantom liquid scintillator is exposed to the radiation beam to produce light that is captured by the cameras that provide a three-dimensional image of the beam.

5 Claims, 15 Drawing Sheets

(56) References Cited

FOREIGN PATENT DOCUMENTS

| JP | 53-057887 | 5/1978 |
|----|-----------|--------|
| KR | 10-2005-0006122 | 1/2005 |

OTHER PUBLICATIONS

Beddar et al., Exploration of the potential of liquid scintillators for real-time 3D dosimetry of intensity modulated proton beams, Apr. 17, 2009, Radiation Therapy Physics, vol. 36, pp. 1736-1743.*

Archambault, et al., "Characterizing the response of miniature scintillation detectors when irradiated with proton beams", *Physics in Medicine and Biology*, 53(7):1856-1876, 2008.

Archambault, et al., "Measurement accuracy and Cerenkov removal for high performance, high spatial resolution scintillation dosimelry", *Medical Physics*, 33(1):128-135, 2006.

Archambault, et al., "Transient noise characterization and filtration in CCD cameras exposed to stray radiation from a medical linear accelerator", *Medical Physics*, 35(10):4342-4351, 2008.

Barkhof, et al., "Verification of the alignment of a therapeutic radiation beam relative to its patient positioner", *Medical Physics*, 26(11):2429-2437, 1999.

Beddar, et al, "Water equivalent plastic scintillation detectors in radiation therapy", *Radiation Protection Dosimetry*, 120:1-6, 2006.

Beddar, et al., "Water-equivalent plastic scintillation detectors for high-energy beam dosimetry: I. Physical characteristics and theoretical consideration", *Physics in Medicine and Biology*, 37(10)1883-1900, 1992.

Beddar, et al., "Water-equivalent plastic scintillation detectors for high-energy beans dosimetry: II. Properties and measurements", *Physics in Medicine and Biology*, 37(10)1901-1913, 1992.

Boon, et al., "Fast 2D phantom dosimetry for scanning proton beams", *Medical Physics*, 25(4):464-475, 1998.

Cirio, et al., "Two-dimensional and quasi-three-dimensional dosimetry of hadron and photon beams with the Magic Cube and the Pixel Ionization Chamber", *Physics in Medicine and Biology*, 49(16):3712-3724, 2004.

Dempsey, et al., "Validation of a precision radiochromic film dosimetry system for quantitative two-dimensional imaging of acute exposure dose distributions", *Medical Physics*, 27(10):2462-2475, 2000.

Frelin, et al., "The DosiMap, a new 2D scintillating dosimeter for IMRT quality assurance: characterization of two Cerenkov discrimination methods", *Medical Physics*, 35(5):1651-1652, 2008).

Gonzalez, et al. Digital Image Processing. $2^{nd}$ ed. New Jersey: Prentice Hall, Jan. 2002. Print.

Gustavsson, et al., "Linear energy transfer dependence of a normoxic polymer gel dosimeter investigated using proton beam absorbed dose measurements", *Physics in Medicine and Biology*, 49(17)3847-3855, 2004.

Karger, et al., "A system for three-dimensional dosimetric verification of treatment plans in intensity-modulated radiotherapy with heavy ions", *Medical Physics*, 26(10):2125-2132, 1999.

Kirov, et al., "New water equivalent liquid scintillation solutions for 3D dosimetry", *Medical Physics*, 27(5):1156-1164, 2000.

Kirov, et al., "The three-dimensional scintillation dosimetry method: test for a 106Ru eye plaque applicator", *Physics in Medicine and Biology*, 50(13):3063-3081, 2005.

Lomax, et al., "Treatment planning and verification of proton therapy using spot scanning: initial experiences", *Medical Physics*, 31(11):3150-3157, 2004.

Low, "Quality assurance of intensity-modulated radiotherapy", *Semin Radiat Oncol*, 12:219-128, 2002.

Niroomand-Rad, et al., "Radiochromic film dosimetry: recommendations of AAPM Radiation Therapy Committee Task Group 55", *Medical Physics*, 25(11):2093-2115, 1998.

Nohtomi, et al., "Dose distribution measurement of clinical proton beams with an imaging plate", *IEEE Nuclear Science Symposium Conference Record*, Oct. 2004.

Oldham, et al., "High resolution gel-dosimetry by optical-CT and MR scanning", *Medical Physics*, 28(7):1436-1445, 2001.

PCT International Preliminary Report on Patentability issued in International Application No. PCT/US2010/041216, mailed Jan. 19, 2012.

PCT International Search Report issued in International Application No. PCT/US2010/041216, mailed Feb. 23, 2011.

Petric, et al., "Development and characterization of a tissue equivalent plastic scintillator based dosimetry system", *Medical Physics*, 33(1):96-105, 2006.

Yu, et al., "Lens coupling efficiency: derivation and application under differing geometrical assumptions", *Medical Physics*, 24(4):565-570, 1997.

* cited by examiner

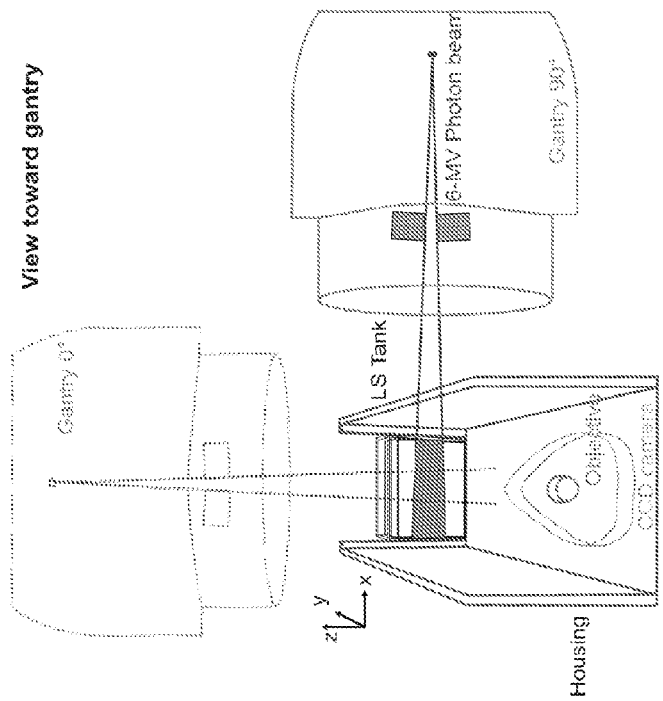
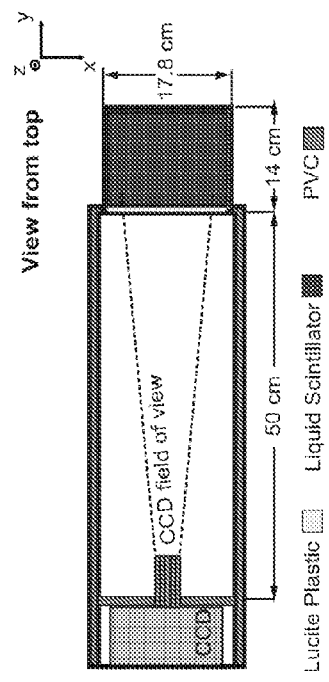
*Figure 1a*
*Figure 1b*

LIQUID SCINTILLATOR FOR 3D DOSIMETRY FOR RADIOTHERAPY MODALITIES

CROSS-REFERENCE TO RELATED APPLICATIONS

This application is a national phase application under 35 U.S.C. §371 of International Application No. PCT/US2010/041216 filed Jul. 7, 2010, which claims priority to U.S. Provisional Patent Application Ser. No. 61/223,619 filed Jul. 7, 2009. The entire text of each of the above-referenced disclosures is specifically incorporated herein by reference without disclaimer.

STATEMENT REGARDING FEDERALLY SPONSORED RESEARCH OR DEVELOPMENT

This invention was made with government support under CA120198-01 awarded by the National Institute of Health. The government has certain rights in the invention.

BACKGROUND OF THE INVENTION

Use of scintillating materials in scanning beam proton therapy have been limited to two-dimensional ("2D") scintillation. Three dimensional ("3D") scintillation has been only used in brachytherapy applications using radioactive sources to study the dosimetric properties of different scintillating solutions with the aim of developing water equivalent dosimeter media at the lower energies suitable for use with commonly used radioactive sources. Such systems have not been used in intensity modulated radiation therapy ("IMRT") beams, scanning proton particles and beams, and/or to characterize the intensity and energy modulated proton therapy beam. Fast, accurate and efficient 3D dosage measurements must be made to ensure patient-specific quality assurance.

SUMMARY OF THE INVENTION

Liquid scintillator detectors ("LSDs") are provided that produce dose verification to meet quality assurance requirements of a broad range of complex radiotherapy modalities such as intensity-modulated radiotherapy ("IMRT") for photon radiotherapy and intensity-modulated proton therapy ("IMPT") for proton therapy. The LSDs can be used to quickly and accurately compare a 3D dose distribution with the planned dose distribution obtained from a treatment planning system. The LSDs can be used on a regular basis to perform the mandatory patient-specific treatment verification in a faster (i.e., only a single irradiation is required) and more thorough (i.e., a complete assessment of the 3D dose distribution is performed) manner than what is currently used as the standard of care. For applications with charged particles such as proton pencil beams, this system and associated methodologies can be used to measure the range, the pencil beam position, and the intensity of the beam. The resulting information can then be used to reconstruct a complete 3D dose distribution.

The LSDs as described herein include a volumetric phantom of liquid scintillator in any shape or form (spherical, rectangular, cubical, cylindrical, columnar, or fiber-like shape) that is exposed to a radiation beam. The scintillation light is produced within the liquid scintillator by the passage of the radiation beam and is acquired in realtime with an orthogonal pair of high-sensitivity/high-speed charged-coupled device cameras (referred to herein as "CCD camera") and/or a combination of three CCD cameras. This device and associated methodology can be used to determine precisely the stopping power ratios of the tissue samples or organ samples specific for each patient. Accurate knowledge of stopping power ratios is critical for accurate prediction of dose distributions computed for planning of proton treatments. The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and are not intended to be used to limit or define the invention.

FIG. 1 is a sketch of the measurement setup and coordinate system. The gantry rotation angle here is 90 degrees (the dotted lines depict a gantry angle of 0 degrees). The acquired 2D image is a projection along the y-direction of the light emitted from the scintillator.

DETAILED DESCRIPTION

Figure 2:
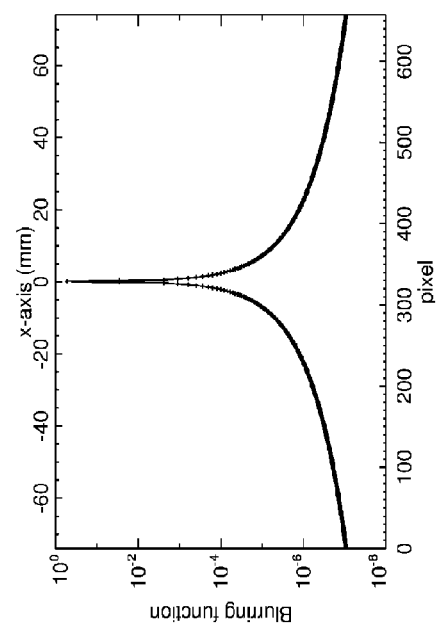
FIG. 2 is a one-dimensional plot of the blurring function h(i,N/2) along the x-axis.

The 3D liquid scintillator detector ("LSD") provided herein can be used to quickly and accurately compare a 3D dose distribution for a broad range of complex radiotherapy modalities with a planned dose distribution obtained from a treatment planning system. The LSD can be used on a regular basis to perform the mandatory patient-specific treatment verification in a faster manner (i.e., only a single irradiation is required) and more thorough (i.e., a complete assessment of the 3D dose distribution is performed) than what is currently used as the standard of care. For applications with charged particles such as proton pencil beams, the device and associated methods can be used to measure the range, the pencil beam position and the intensity of the beam. The resulting information can then be used to re-construct a complete 3D dose distribution.

The LSD comprises a 3D volumetric phantom of liquid scintillator in any shape or form (spherical, rectangular, cubical, cylindrical, columnar or fiber-like shape) that is exposed to a radiation beam. The scintillation light produced within the liquid scintillator by the passage of the radiation beam is acquired in realtime with any orthogonal pair or a combination of three high-sensitivity/high-speed digital imaging devices, including, but not limited to, CCD or CMOS cameras. This device can be used to determine precisely the stopping power ratios of the tissue samples or organ samples for each patient. Accurate knowledge of stopping power ratios are critical for accurate prediction of dose distributions computed for planning of proton treatments.

The LSD can acquire three-dimensional dosimetric information from a radiation beam in realtime. The radiation beam may be a charged particle beam such as a proton beam or a photon beam. The radiation beam incident on the device will interact with the liquid scintillator and produce visible light that will travel in the transparent material and get captured by a pair of orthogonal CCD cameras. The CCD cameras produce images of the radiation beam. Processing these images allows a complete characterization of the radiation beams (dose deposited, depth dose curves, lateral profile, geometric accuracy etc.) in realtime. The CCD cameras are aligned with the liquid scintillator phantom and the complete system is kept in a light-tight environment to prevent contamination by external sources of light that could bias measurements. The device and associated methodologies are designed to be used for both photon and charged particles such as protons. Photon treatments represent the large majority of radiotherapy treatments in the world. Cancer treatments with charged particles is a highly promising modality with a rapidly increasing number of clinics throughout the US.

For photon applications, the purpose of the device and methodology is to rapidly and accurately measure an entire 3D dose distribution and compare this measurement with the planned distribution. An entire 3D dose distribution can be evaluated using gel dosimeters, however, the gels require special preparation and have a limited lifetime shelf. The dose information process requires a lengthy and delicate processing procedure and does not offer real-time capabilities. Moreover, gel dosimeters are not well suited for frequent patient-specific verifications. On the other hand, the device disclosed herein can be used to assess a 3D dose distribution in realtime and detect if something differs from the original treatment plan, saving time and money while performing mandatory treatment verification for complex modalities such as IMRT.

For charged particles applications, real-time measurements for the accurate quality assurance of intensity-modulated proton therapy ("IMPT") beams (also referred to herein as radiation beams) can be made. These measurements are delivered with magnetically scanned proton pencil beams of varying energies. QA checks are mandatory for each IMPT beam for each patient. However, the currently available devices (ion chambers, films, etc.) require a significant amount of time and labor. Measuring residual proton pencil beam range is important after traversal through either a tissue sample or, eventually, through a patient (i.e., in vivo measurements). The measured beam's data is processed to determine precisely the stopping power ratios of the tissue sample or the patient tissues. Accurate knowledge of stopping power ratios is critical for accurate prediction of dose distributions computed for planning of proton treatments. Dosimetry of transmitted scanned pencil beams also provide in-vivo quality assurance.

In scanning beam proton therapy (and more generally, particle therapy), fast, accurate and efficient 3D dose measurements for characterization of intensity and energy modulated proton therapy ("IMPT") beams and patient-specific quality assurance of such beams is a considerable challenge. Each IMPT beam in a treatment may employ thousands of individual pencil beams (or "spots") of variable intensities, energies and positions to produce highly inhomogeneous dose distributions within the target. The sum of contributions of all such beams is the desired dose distribution in the target. For this emerging technology of IMPT, continuous profile scanning with a conventional ion chamber (or diode) is not feasible because the pencil beam sweeps continuously over a certain line in a given time, and any profile acquired with a moving detector would not be representative of a true dose profile. The alternative approach of integrating dose at each of a sequence of points would be extremely time consuming and impractical because complete scan pattern would have to be delivered for each point.

Because modern radiation therapy such as intensity-modulated radiation therapy using a linear accelerator requires dosimetric verification of the treatment plan and treatment delivery, different detector systems have been employed for patient-specific quality assurance ("QA"). A commonly used method is based on radiographic film dosimetry, where the film is placed inside a phantom to obtain a 2-dimensional (2D) dose distribution. D. A. Low, *Quality Assurance of Intensity-Modulated Radiotherapy*, Sem. Rad. Oncol. 12, 219-128 (2002). A similar technique employs Gafchromic® films. See e.g., J. F. Dempsey, D. A. Low, S. Mutic, J. Markman, A. S. Kirov, G. H. Nussbaum, and J. F. Williamson, *Validation Of A Precision Radiochromic Film Dosimetry System For Quantitative Two-Dimensional Imaging Of Acute Exposure Dose Distributions*, Med. Phys. 27, 2462-2475 (2000). The low effective atomic number provides a better energy dependence compared to radiographic films; however, this also leads to a reduced sensitivity to radiation and thus to a smaller digitalization range. Precise measurements are more time consuming and the uniformity of the film is lower than radiographic films. A. Niroomand-Rad, C. R. Blackwell, B. M. Coursey, K. P. Gall, J. M. Galvin, W. L. McLaughlin, A. S. Meigooni, R. Nath, J. E. Rodgers, C. G. Soares, *Radiochromic Film Dosimetry: Recommendations Of AAPM Radiation Therapy Committee Task Group* 55, Med Phys. 25, 2093-2115 (1998).

As mentioned above, other high-resolution dosimeters have employed polymer gels, often using either an optical or MRI scanner for the read-out. M. Oldham, J. H. Siewerdsen, A. Shetty, D. A. Jaffray, *High Resolution Gel-Dosimetry By Optical-CT And MR Scanning*, Med. Phys. 28, 1436-1445 (2001). These methods, however, are time consuming and the dosimetric properties of many gels are yet to be established. The dose information that they provide lacks reproducibility. Thus, they may not be efficient for clinical routine QA.

Other approaches have included the use of scintillating materials. Boon et al. used a 2D scintillation screen located distally behind a slab of water equivalent material and measured the relative amount of light detected by the CCD camera. S. N. Boon, P. van Luijk, J. M. Schippers, H. Meertens, J. M. Denis, S. Vynckier, J. Medin, and E. Grusell, *Fast 2D Phantom Dosimetry For Scanning Proton Beams*, Med. Phys. 25, 464-475 (1998). Petric et al. used a similar experimental setup and applied a deconvolution of the 2D light signal to obtain a 2D dose distribution. M. P. Petric, J. L. Robar, and B. G. Clark, *Development And Characterization Of A Tissue Equivalent Plastic Scintillator Based Dosimetry System* Med. Phys. 33, 96-105 (2006). However, both detector designs are limited to a single 2D imaging plane perpendicular to the direction of the beam and thus no depth dose distribution or any type of depth information can be directly measured.

Recently, Frelin et al. presented a new 2D scintillation dosimeter for IMRT QA, which consisted of a plastic scintillating sheet placed inside a transparent polystyrene phantom, and investigated methods to correct for Č erenkov radiation. A. M. Frelin, J. M. Fontbonne, G. Ban, J. Colin, M. Labalme, A. Batalla, A. Vela, P. Boher, M. Braud, and T. Leroux, *The Dosimap, A New 2D Scintillating Dosimeter For IMRT Quality Assurance: Characterization Of Two Čerenkov Discrimination Methods*, Med. Phys. 35, 1651-1662 (2008).

Likewise, Kirov et al. used a liquid scintillator (LS) for 2D dosimetry. 6 & 7H. Gustaysson, S. J. B, ck, J. Medin, E. Grusell, and L. E. Olsson, *Linear Energy Transfer Dependence Of A Normoxic Polymer Gel Dosimeter Investigated Using Proton Beam Absorbed Dose Measurements*, Physics in Medicine and Biology 49, 3847-3855 (2004). However, Kirov et al. extended this technique to 3D applications only for brachytherapy. In their approach, Kirov et al. had to slowly rotate the radiation source inside the liquid scintillator. A slow rotation of the radiation source is not feasible with external radiation beams. The present device does not involve any rotation. Moreover, in the system proposed by Kirov et al., the total acquisition of a single dose distribution was over 20 minutes. With our invention, the data acquisition occurs over the same time as the clinical treatment delivery (typically less than 2 minutes). Brachytherapy is a sealed source radiotherapy or endocurietherapy, and a particular form of radiotherapy where a radioactive source is placed inside or next to the area requiring treatment.

Kirov et al. investigated the use of liquid scintillators for brachytherapy applications and, in doing so, was focused on studying the dosimetric properties of different scintillating solutions with the aim of developing water equivalent dosimeter media at the lower energies that are suitable for use with the most commonly used radioactive sources. A. S. Kirov, S. Shrinivas, C. Hurlbut, J. F. Dempsey, W. R. Binns, J. L. Poblete, *New Water Equivalent Liquid Scintillation Solutions For 3D Dosimetry*, Med. Phys. 27, 1156-1164 (2000). This idea was then developed and applied to a small 3D dosimetry system (a system less than $10 \times 10 \times 10$ cm$^3$), which was developed for brachytherapy application to eye plaques. A. S. Kirov, J. Z. Piao, N. K. Mathur, T. R. Miller, S. Devic, S. Trichter, M. Zaider, C. G. Soares, and T. LoSasso, *The Three-Dimensional Scintillation Dosimetry Method: Test For A $^{106}$Ru Eye Plaque Applicator*, Phys. Med. Biol. 50, 3063-3081 (2005). His methods, however, are neither applicable nor useful to external beam radiotherapy.

Furthermore, different stationary detector systems have been previously used to measure 2D proton dose distributions perpendicular to the beam direction. For example, Lomax et al. obtained orthogonal profiles with 25 ion chambers arranged in a cross, while Boon et al. used a 2D scintillation screen located distally behind a slab of water-equivalent material in combination with a mirror and CCD camera, and Nohtomi et al. employed an obliquely oriented photoluminescence detector plate inside a water phantom. A. J. Lomax, T. Böhringer, A. Bolsi, D. Coray, F. Emert, G. Goitein, M. Jermann, S. Lin, E. Pedroni, H. Rutz, O. Stadelmann, B. Timmermann, J. Verwey, and D. C. Weber, *Treatment Planning And Verification Of Proton Therapy Using Spot Scanning: Initial Experiences*, Medical Physics 31, 3150-7 (2004); S. N. Boon, P. van Luijk, J. M. Schippers, H. Meertens, J. M. Denis, S. Vynckier, J. Medin, and E. Grusell, *Fast 2D Phantom Dosimetry For Scanning Proton Beams*, Medical Physics 25, 464-75 (1998); A. Nohtomi, T. Sakae, T. Terunuma, Y. Tsunashima, and Y. Hayakawa. *Dose Distribution Measurement Of Clinical Proton Beams With An Imaging Plate*, in Nuclear Science Symposium Conference Record, 2004 IEEE. 2004. However, the 2D method requires multiple layers of material with different thicknesses to obtain the 3D dose, which would require multiple beam deliveries.

This problem was approached by Cirio et al., who built a very complex detector system based on a layout from high energy particle physics experiments. See, R. Cirio, E. Garelli, R. Schulte, S. Amerio, A. Boriano, F. Bourhaleb, G. Coutrakon, M. Donetti, S. Giordanengo, P. Koss, E. Madon, F. Marchetto, U. Nastasi, C. Peroni, D. Santuari, A. Sardo, G. Scielzo, M. Stasi, and E. Trevisiol, *Two-Dimensional And Quasi-Three-Dimensional Dosimetry Of Hadron And Photon Beams With The Magic Cube And The Pixel Ionization Chamber*, Physics in Medicine and Biology 49, 3713-24 (2004). It consisted of 12 large-area parallel plate ionization chambers, each further divided into pixel ion chambers. The clinically utilized detector system by Karger et al., which comprised an array of up to 24 pin-point ion chambers inside a water tank, provided fast and instant read-out capabilities for patient-specific dosimetry. C. P. Karger, O. J. Kel, and G. H. Hartmann, *A System For Three-Dimensional Dosimetric Verification Of Treatment Plans In Intensity-Modulated Radiotherapy With Heavy Ions*, Medical Physics 26, 2125-32 (1999).

Furthermore, while the ion chamber detectors are the gold standard in radiation therapy dosimetry, an array of ion chambers lacks the spatial resolution because the detectors tend to be separated by distances of the order of 1 cm. In contrast, dosimetric gels exhibit better spatial resolution and are an alternative for 3D dosimetry; however, they exhibit LET dependence, require time consuming processing and can only be exposed once.

Presented herein are new methods and devices for measuring dosage in therapeutic high-energy photon beams using a much larger LS detector. This detector specifically differs from a two-dimensional plastic scintillation layer in the way the signal is generated. Unlike the prior art, the system presented herein collects data from signals generated in a 3D volume instead of a 2D plane. As a result, the LSDs presented herein can be useful as a QA tool for fast, accurate and high-resolution dosimetry as this liquid scintillator has the potential of providing real-time dosimetric information in 2D with the eventual goal of measuring dose in a 3D volume.

To develop the LSD for the measurement of 3D dose distributions in real time for intensity and energy-modulated proton therapy, a plastic tank filled with liquid scintillator was irradiated with pristine proton Bragg peaks. Scintillation light produced during the irradiation was measured with a CCD camera. Acquisition rates of 20 or 10 frames per seconds (fps) were used to image consecutive image frame sequences. These measurements were then compared to ion chamber measurements and Monte Carlo simulations. Doses measured from the images acquired at rates of 20 fps and 10 fps have a standard deviation of 1.1% and 0.7%, respectively, in the plateau region of the percent depth dose curve. Differences were seen between the raw LS signal and the ion chamber due to the quenching effects of the LS. This effect can be accounted for and corrected by Monte Carlo simulations. Once corrected, dose distributions measured with the LS were in good agreement with ion chamber measurements.

Hence, devices useful for dosimetry of a broad range of complex radiotherapy modalities, such as intensity-modulated proton therapy ("IMPT") for proton therapy, using liquid scintillator detectors are provided herein. The systems presented herein may be useful for patient-specific quality assurance ("QA"), providing fast, accurate, and high-resolution dosimetry. These systems may provide real-time dosimetric information in both 2D planes and 3D volumes for radiation beams of either photons or protons. The radiation beam is interacting with the LS material to produce visible light. This light may be acquired in realtime with one or more high-sensitivity/high-speed CCD cameras. (As used herein, "processing in near realtime" or "realtime" generally refer to processing data without intentional delay, given the limitations of the system and the time required to accurately measure the data.) Processing these images in near realtime allow the characterization of the radiation beams. (As used herein, "processing in near realtime" or "realtime" generally refer to processing data without intentional delay, given the limitations of the system and the time required to accurately measure the data.) The images can be compared with the treatment plan. Any significant differences between the measured images and the treatment plan can indicate a deviation from the plan and can therefore be corrected before the actual treatment delivery. This verification procedure can work for any type of radiation (photons or protons). In addition to this, using this system with scanned proton or other charged particle (herein referred to generally as charged particles, or "CP") pencil beam will verify the beam range, position, and intensity. Better resolution may be obtained by an orthogonal pair of CCD cameras and/or a combination of three CCD cameras (an orthogonal pair with the third CCD orthogonal to the pair). Processing the images acquired with CP may allow a complete characterization of the radiation beams (dose deposited, range of the protons, depth dose curves, lateral profile, etc.) in near realtime. The CCD cameras may be rigidly aligned with the LS phantom, and the complete system may be kept in a light-tight environment to prevent contamination by external sources of light that could bias measurements.

Figure 9:
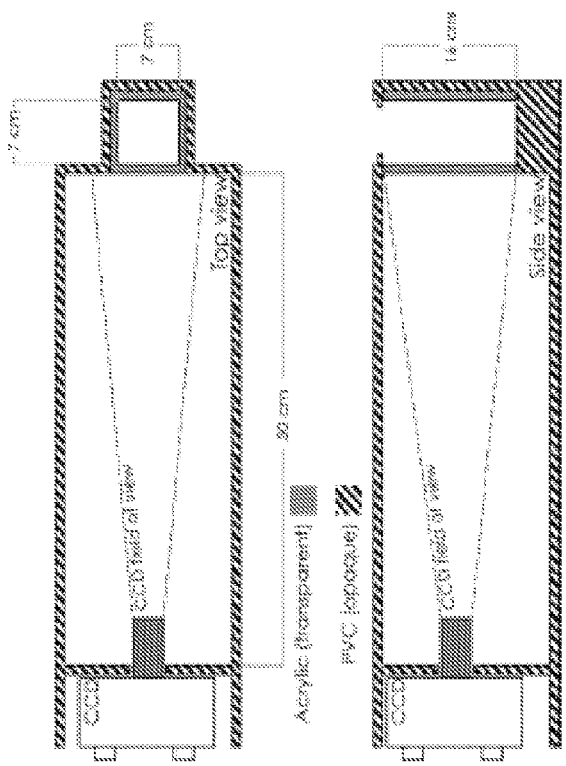
FIG. 9 shows the detector consisting of a light-tight gray PVC phantom, a transparent acrylic inner tank filled with liquid scintillator, and a CCD camera where the dashed lines represent the camera's field of view.
Figure 14:
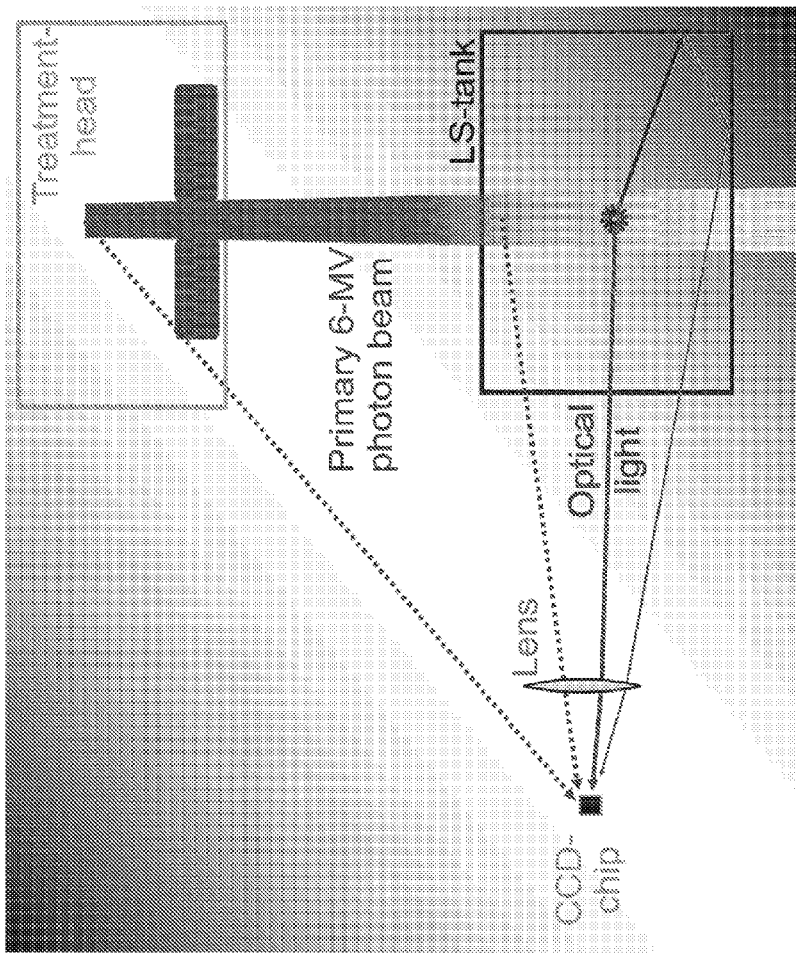
FIG. 14 is a schematic showing the effects that alter an image during the image generation process.
Figure 15:
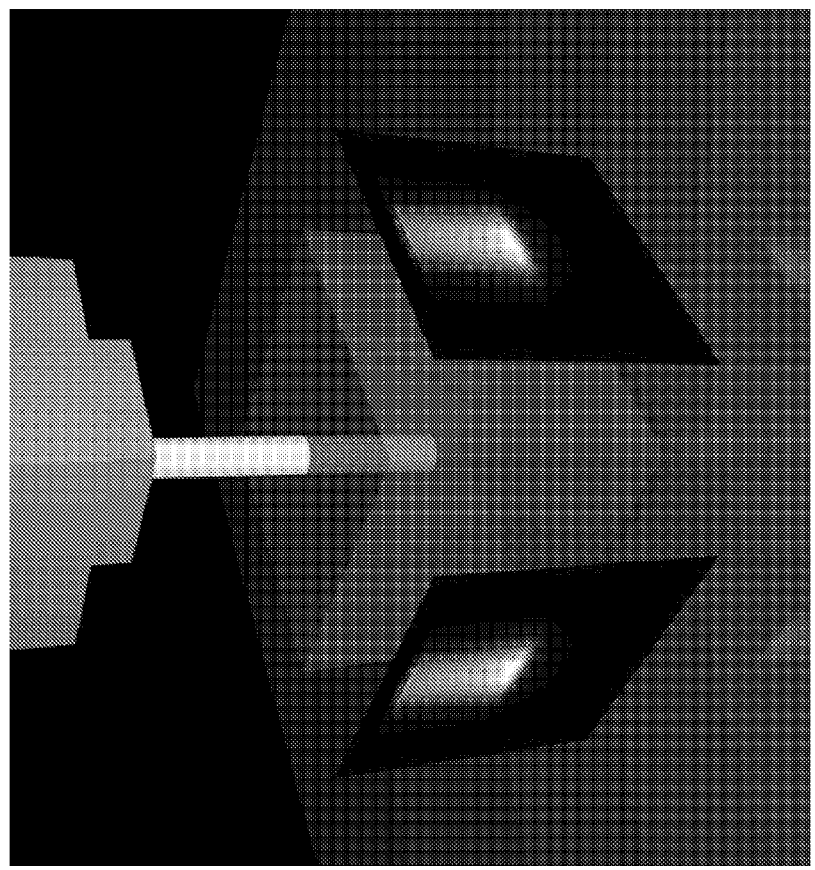
FIG. 15 is a schematic illustrating imaging the dose distribution captured by two cameras.

As illustrated in FIGS. 1, 9 & 14, the liquid scintillator detector ("LSD") presented herein can make dose measurements and QA requirements of radiotherapy beams. This LSD 100 may include a tank 110, having walls 120 which is filled with liquid scintillating material 130, a housing 140, and a pair of CCD cameras 150a, 150b with objective lens 160. The walls 120 of tank 110 may be made of acrylic materials, such as Lucite®. The tank 110 can be made in the shape of a rectangular solid. For example, the tank 110 may have dimensions of about 7 cm×about 7 cm×about 16 cm.

The housing 140 may be made of dark polyvinyl chloride ("PVC") or other light-tight material. Even though the LS material 130 is substantially transparent to the light it produces, some absorption might occur, and diffusion by Rayleigh scattering may result in a light distribution that is blurred. Additionally, some light may be reflected on the walls 120 of the tank 110. Thus, the background level may be nonzero. This effect may be especially strong in embodiments with narrow tank cross sections (i.e., less than about 7×7 cm$^2$). To reduce this source of artifact to negligible levels, the walls 120 of the tank 110 may be dark gray or black in color and grainy in texture. The LS material may be made of organic scintillation material. For example, suitable LS material may include BC-531, which is commercially available from Saint-Gobain, Newbury, Ohio. Other suitable LS materials may include BC-400, polystyrene, and/or water.

The objective lens 160 collects scintillation light produced in the 3D liquid scintillator volume and to form an image in the light sensitive area of the CCD camera (sometimes referred to as the camera's focal plane or the CCD chip). The overall performance of the LSD system will depend on the properties of the lens and the sensitivity of the CCD camera. In particular, the region, or depth, over which an image is sufficiently in focus is called depth of field ("DOF"). With geometric optics, it is possible to describe the proximal distance ("$d_p$") and distal distance ("$d_d$") of the DOF:

$$d_p = \frac{d_o \cdot f^2}{f^2 + F \cdot c \cdot (d_o - f)} \qquad \text{Eq. 1}$$

$$d_d = \frac{d_o \cdot f^2}{f^2 - F \cdot c \cdot (d_o - f)} \qquad \text{Eq. 2}$$

where $d_o$ is the distance between an object and the lens, F is the f-number of the objective lens (i.e., the ratio of the focal length $f$ and the lens diameter), and c is the acceptable diameter of blurring (or "circle of confusion") around an image point. For a digital, pixilated imager such as a CCD camera, it is common practice to set the value of c as the size of one CCD pixel. The spatial resolution of the LSD may be determined by two factors: the blurring of the image due to light diffusion and the discrete nature of the pixels. The spatial resolution may be limited by the pixel size. Smaller the pixel size typically results in better spatial resolution. Interpolating between pixel values can result in a better spatial resolution than the pixel size. The field of view and the spatial resolution are both linearly dependent on the distance between the CCD camera and the LSD. Increasing the distance between the CCD camera and the LSD can increase the field of view, but that will also increase the pixel size.

Example 1

Materials and Methods

Detector System

The detector system consisted of a light shielded, LS-filled acrylic tank (outer dimensions: 17.8×14.0×12.7 cm$^3$, 3 mm wall thickness), a camera objective and a high sensitivity electron-multiplying CCD camera (Luca EM, And or Technology, South Windsor, Conn.) and is shown in FIG. 1. A housing box, made of dark PVC, enclosed all components and insulated the inner compartment from ambient light. A regular 25 mm camera objective (JML Optical Industries, Inc., Rochester, N.Y.) with adjustable focal length and variable aperture (F-number=0.95-22) was mounted onto the camera's front to focus the acquired image to the CCD chip. The chip had a resolution of 658×496 pixels and a color depth of 14 bits, thus providing 16,383 gray scale levels and allowing for a large dynamic range for image processing. The distance between the tip of the camera objective and the center of the tank was 55 cm, which resulted in a pixel size of 0.22 mm or a field of view of 14.8×11.2 cm², which was slightly smaller than the size of the tank. The setup of our detector system differs from a conventional portal imaging system in that a lateral beam view can be acquired and thus percent depth doses (PDD) as well as lateral dose distributions can be measured at the same time. To avoid any systematic deviations, a background image was taken before each series of measurements and subtracted from the acquired images. Finally, the images were filtered using a median filter with a size of 7×7 pixels to eliminate radiation induced artifacts, which arise from scatter radiation and leakage of the treatment head that interact with the CCD chip of the camera.

The commercially available LS material, BC-531 (Saint-Gobain, Newbury, Ohio), was used in this system. To determine the dosimetric characteristics of this LS material, a CT scan was performed and the CT number was obtained. The measured CT number was then converted into a density value using our institutional calibration table. This transformation resulted in a density of 0.86 g/cm³, which would be used for calculations by the treatment planning system. Since this value is very close to the physical density given by the manufacturer of 0.87 g/cm³, no conversion or density overrides were necessary after the LS phantom scanned, and thus the obtained CT could be used immediately without applying any corrections.

The detector system was irradiated with 6-MV photons from a Varian Clinac 21EX (Palo Alto, Calif.) linear accelerator under standard conditions, i.e., SSD=100 cm, and gantry angles of 0 and 90 degrees. Images were acquired for different field sizes, dose rates and camera light enhancement modes. The measured light signals were compared to the dose profiles of the treatment machine provided by the commissioned treatment planning system (Pinnacle³, version 8.1w, Philips Medical Systems, Fitchburg, Wis.).

Image Processing and Dose Reconstruction

The goal of imaging processing is to remove background noise and convert the acquired light signal to dose. One basic assumption is that the dose is proportional to the scintillation light, and this is verified below. Under ionizing radiation the LS isotropically emits visible blue light with a peak wavelength of 425 nm. Despite the low optical attenuation of the LS (which is equal to 3.5 m⁻¹ and corresponds to a 2% light absorption over a 7 cm path length of the LS), the emitted light may scatter within the liquid and can be reflected at the walls of the acrylic tank. Furthermore, Čerenkov radiation is produced by high-energy delta rays during MV photon beam irradiation. See A. S. Kirov, Z. Piao, S. Devic, S. Shrinivas, A. S. Beddar, W. R. Binns, T. J. Kinsella, and C. H. Sibata, *An Estimate Of The Perturbing Effect Of Cerenkov Radiation To The Signal From A Liquid Scintillator Volume Irradiated By A Megavoltage Photon Beam*, Engineering in Medicine and Biology Society, Proceedings of the 22nd Annual International Conference of the IEEE, vol. 4, 3148-3151 (2000). Both processes produce additional background, leading to a blurring of the dose distribution. Thus, the measured light signal from the CCD camera may not be directly proportional to the absorbed dose. The image forming process can be expressed as a convolution of the original image o with a blurring function h resulting in the measured image p:

$$p(i,j)=h(i,j)*o(i,j). \quad (1)$$

To reconstruct the original 2D dose distribution with a size of M×N from the measured light image, a deconvolution algorithm was applied. In this work, a Wiener filter algorithm was used, which is given in the frequency domain by the expression:

$$O(u, v) = \left[\frac{1}{H(u,v)} \frac{|H(u,v)|^2}{|H(u,v)|+K}\right] P(u,v). \quad (2)$$

An inverse Fourier transform was applied to O(u,v) to obtain o(i,j). The term contained inside the brackets in Eq. (2) is commonly referred to as the least square error filter. R. C. Gonzalez and R. E. Woods, *Digital Image Processing*, 2nd Ed., (Prentice-Hall, N.J., 2002) The filter depends on the image degrading function H(u,v) and a specific constant K. The degrading function or image disturbance function, h, must be known or approximated. We assumed a linear combination of a 2D Lorentzian function l and a 2D Gaussian function g using a constant weighting factor c:

$$h(i,j) = c \cdot g(i,j) + l(i,j) \text{ with} \quad (3)$$

$$g(i,j) = \frac{1}{2\sigma}\exp[(i-M/2)^2 + (j-N/2)^2] \text{ and} \quad (4)$$

$$l(i,j) = \frac{1}{1+\frac{(i-M/2)^2+(j-N/2)^2}{\gamma}}, \quad (5)$$

where i and j represent the pixel indices. This type of function was used in a previous LS study for a different configuration. A. S. Kirov, J. Z. Piao, N. K. Mathur, T. R. Miller, S. Devic, S. Trichter, M. Zaider, C. G. Soares, and T. LoSasso, *The Three-Dimensional Scintillation Dosimetry Method: Test For A 106Ru Eye Plaque Applicator*, Phys. Med. Biol. 50, 3063-3081 (2005). FIG. 2 shows the blurring function using the following constant parameters: c=5.5, σ=0.4, and γ=0.35. The parameters were first manually optimized to match the data from the treatment planning system with the measured deconvolved light signal for a 5×2 cm² field. We then verified the choice of these parameters for this field using an iterative algorithm. For this we defined a cost function:

$$f=\Sigma[o(i,j)-d(i,j)]^2 \quad (6)$$

where d(i,j) is the dose from the treatment planning system. We systematically explored the phase space of these three parameters around the initial values and found that $f$ was stable. These parameters are specific for this detector system and were used for deconvolution of all measured light images. Note that the disturbance function in FIG. 2 is given in position space and must be transformed into frequency space for use in Eq. (2).

Experiments

Dose Linearity

An ideal detector system should respond linearly to the absorbed dose deposited within the detector. In order to verify this for our dosimetry system, we measured the light signal of the LS produced by a 6-MV photon beam. To keep the background noise constant, we used a constant acquisition time of 25 s, a dose rate of 600 MU/min and a field size of 4×4 cm$^2$.

For data evaluation, we placed a region of interest ("ROI") at the area containing maximum signal within the 2D CCD image and calculated the mean value of these pixels. In this experiment, an ROI size of 10(x)×5(y) pixels was chosen because less variation in pixel value was expected along the x-direction (abscissa) than in the y-direction (ordinate of the 2D CCD image), with a steeper dose gradient.

Interruptions During Delivery of Multiple Segments or Fields

This test was performed to evaluate whether discontinuous irradiation, i.e., the photon beam being stopped for few seconds during image acquisition, affects the measured CCD camera signal. Such beam interruptions occur in IMRT treatment with step-and-shoot techniques. If this detector were to be used for patient-specific QA, one would wish to keep acquiring data until the entire field is delivered for each beam angle. Alternatively, one might want to measure the dose deposition over an entire treatment, allowing for interruptions while changing the gantry angles and field sizes. In this experiment, the scintillator was irradiated to a total dose of 1 Gy and the CCD camera acquisition time was set to a constant value of 25 s. We stopped the beam up to 3 times and compared the average light signal for different ROI positions representing the maximum light signal at 1.8 cm, and 5.4 cm and 9.7 cm depths within the LS.

Dose Rate Dependence

The dose rate dependence was tested using a long enough acquisition time of 17 s to deliver a constant dose of 25 cGy for dose rates ranging from 100 to 600 MU/min. This relatively small dose was chosen to keep the acquisition time comparable to other measurements. The field size was 5×5 cm$^2$.

Lateral Profile Dependence on the Field Size

As mentioned earlier, the CCD camera measures a projection of the emitted light; therefore, changing the field size in the x- and y-directions results in different acquired images. In order to validate the lateral profiles, two series of measurements were performed in which the field size was varied both parallel and perpendicular to the field of view of the CCD camera. In the first measurement series, we varied the field size in the x-direction and kept the field size for the y-direction constant at 2 cm. In the second measurement series, the x-direction was set to 2 cm and the field size in the y-direction was varied. The aperture of the objective lens for this set of measurements was set at F=8 to allow more light to reach the CCD chip, because of the rather low dose of 25 cGy used in this experiment. The dose rate was 400 MU/min and the acquisition time 5 s. A set of profiles was then compared to the profiles obtained from the treatment planning system.

Percent Depth Dose Analysis

Analysis of the percent depth dose (PDD) is a very reliable way of validating the performance of the detector system because the dose deposition falls off in an exponential slope after the dose maximum. The gantry was rotated to 90 degrees, and thus the beam entered through the lateral wall of the acrylic tank, which provided a 3.6 cm longer measurement area along the beam-axis compared to a 0 degree beam for our fixed CCD camera setup. The field size was set to 5×5 cm$^2$ and 28 MUs were delivered. Furthermore, since the size of the imaging area was smaller than the size of the LS tank, the camera was shifted laterally by a few centimeters to image the build-up part of the PDD curve.

Verification of the Dose Distribution of a Four-Field-Box Plan

In order to validate delivery of a dose distribution for multiple beam angles, one simple four-field box-type treatment plan was created and delivered. The LS tank was first simulated with a CT scanner (GE Lightspeed, GE Healthcare Technologies, Waukesha, Wis.), and then the data was transferred to the treatment planning system. For this experiment, the LS detector was irradiated from 4 cardinal beam angles (0, 90, 180 and 270 degrees). The field size was 5×5 cm$^2$. The beams were equally weighted at the isocenter, resulting in a delivery of 28 MUs for the AP/PA beams and 25 MUs for the lateral beams for a total dose of 90 cGy. During irradiation, each field was separately imaged. Analogous to the previous subsection, we applied the adapted light background subtraction correction to each of the 4 images. The final light signal distribution was the sum of these four images, and was compared to the dose distribution obtained from the treatment planning system.

Results

Light Dose Response

Figure 3:
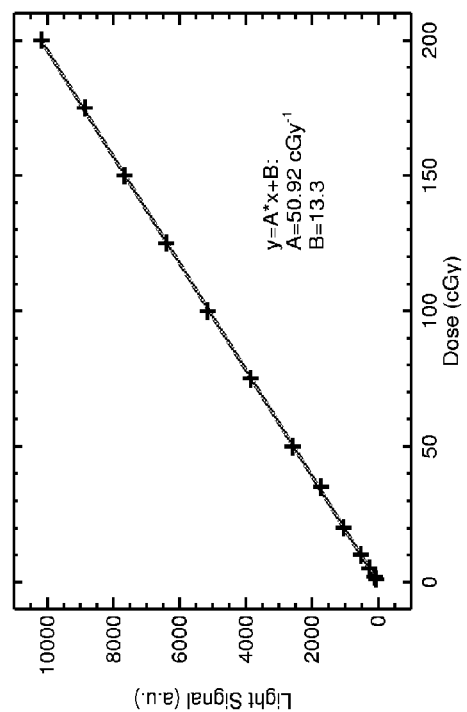
FIG. 3 is a measured light-dose response (symbols) where the solid line depicts a linear curve fit with a correlation coefficient of R=0.99995.

FIG. 3 shows the mean pixel value for the maximum dose within the 2D image as a function of delivered dose. Linear regression analysis showed a strong linear relationship between increasing dose and the measured light signal, with a slope of 50.9 cGy$^{-1}$. The slope of the curve depends on many factors, e.g., lens aperture size (in this experiment set to F=16), distance from the CCD camera to the LS tank and the CCD camera acquisition parameters including acquisition time and electron multiplication factor. Thus, the final detector system would need to be calibrated according to the particular settings if it were to be used as an absolute dosimeter.

Irradiation Interruptions

Table 1 shows the results for the light signal output as a function of the number of beam interruptions. We found that the number of beam interruptions did not affect the measured light signal, nor was there a clear trend between the number of interruptions and the observed signal. The relative standard deviation was less than 0.5% in the maximum dose region and less than 1% in the distal fall-off region (about 74% of the maximum dose).

TABLE I

Light signal at different depths within the LS depending on the number of interruptions.

| Number of | CCD signal (a.u.) | | |
|---|---|---|---|
| Interruptions | ROI at 1.8 cm | ROI at 5.4 cm | ROI at 9.7 cm |
| 0 | 5085 | 4555 | 3735 |
| 1 | 5130 | 4559 | 3787 |
| 2 | 5099 | 4508 | 3816 |
| 3 | 5124 | 4542 | 3749 |
| Mean: | 5109 | 4541 | 3771 |
| Rel. Standard Deviation: | 0.4% | 0.5% | 1.0% |

Dose Rate Dependence

The dose rate dependence is shown in table 2. For dose rates ranging from 100-600 MU/min, the variation in light signal output was less than 0.3%, and there was no trend with increasing dose rate. The rather small variation is mainly due to fluctuations in the actual dose delivered by the accelerator.

TABLE II

Light signal dose rate independence for a fixed dose of 25 cGy.

| Dose Rate (MU/min) | CCD signal (a.u.) |
|---|---|
| 100 | 6843 |
| 200 | 6835 |
| 300 | 6806 |
| 400 | 6842 |
| 500 | 6863 |
| 600 | 6820 |
| Average | 6835 |
| Standard Deviation | 20 |

Lateral Profile Dependence on the Field Size

Figure 4:
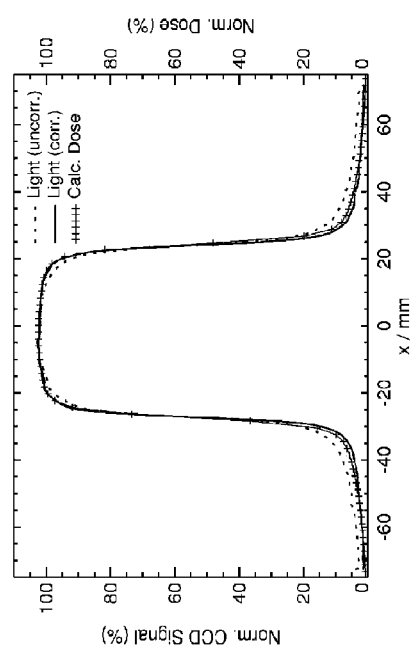
FIG. 4 provides a comparison between uncorrected and corrected light signal and dose profile obtained from the treatment planning system for a 5×2 cm$^2$ field.
Figure 5:
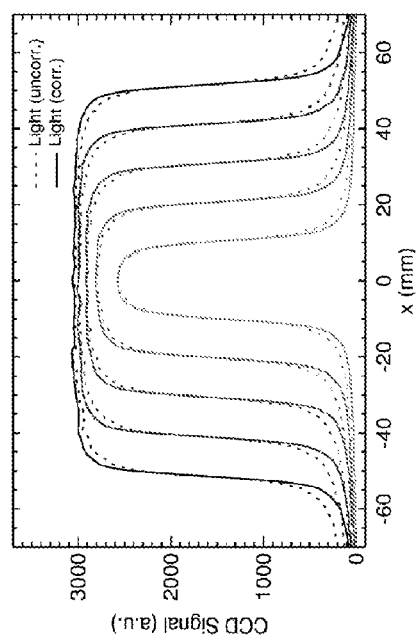
FIG. 5 shows lateral profiles for different field sizes (2×2, 4×2, 6×2, 8×2 and 10×2 cm2) in the x-direction, measured at the depth of maximum dose and averaged over 5 pixels in the y-direction.

The light output for a 5×2 cm$^2$ field is shown in FIG. 4. Comparison between the uncorrected and corrected signals to the dose distribution obtained from the treatment planning system shows that the shape and field width of the uncorrected signal is in general in good agreement with the dose profile, except at the shoulder and tail. Correction of the light signal using the Wiener filter improves agreement, resulting in a maximum deviation of less than 1%. Profiles for a various field sizes in the x-dimension (in-plane direction) are shown in FIG. 5. Comparison between the uncorrected and corrected light signals shows the same trend in which the height of the shoulder increases and the gradient of the tail decreases for all field sizes. There is an expected increase in the maximum signal output with increasing field size due to increased output of the treatment machine with increasing field size. The integral of each profile is also linear with the irradiated area. The profiles are very symmetric with respect to the central axis; the measured width is also proportional to the set field size of the linear accelerator.

Figure 6A:
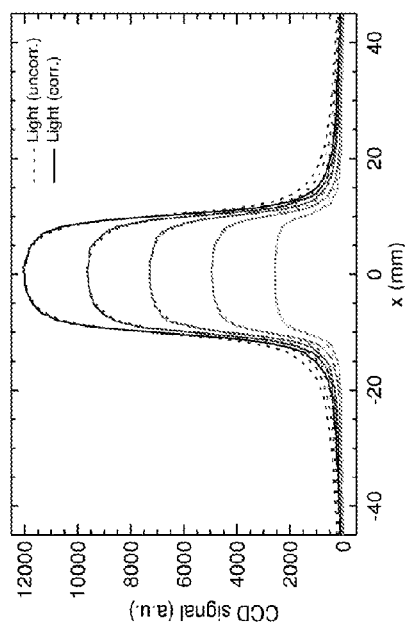
FIG. 6 shows lateral profiles along the x-direction: (a) dependence of the light signal on the size of the field along the y-(cross-plane) direction for field sizes (2×2, 2×4, 2×6, 2×8 and 2×10 cm$^2$); and (b) normalized output for 2×2, 2×6, and 2×10 cm.
Figure 6B:
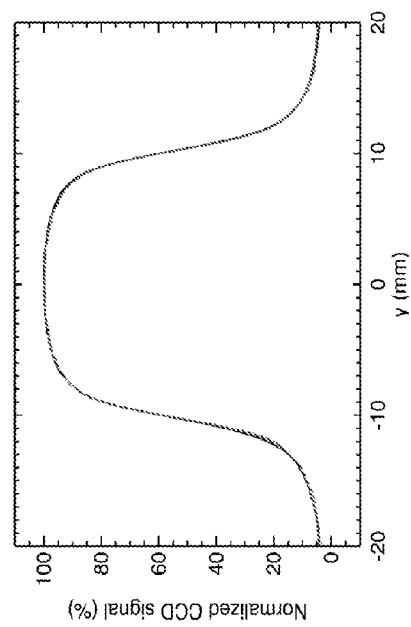

Increasing the field size in the y-(cross-plane) direction results in profiles whose maxima increase linearly with the field size (FIG. 6($a$)). This expected result is due to the increasing irradiated area. Therefore, increasing the irradiated volume of the LS will result in an increased light production in the LS. The tails in the dose fall-off region also increase with increasing field size in the y-direction. However, as seen in FIG. 6($b$), normalization of the light signal with respect to the maximum of the profile results in a fairly constant output over a wide range of field sizes.

Percent Depth Dose Analysis

Figure 7B:
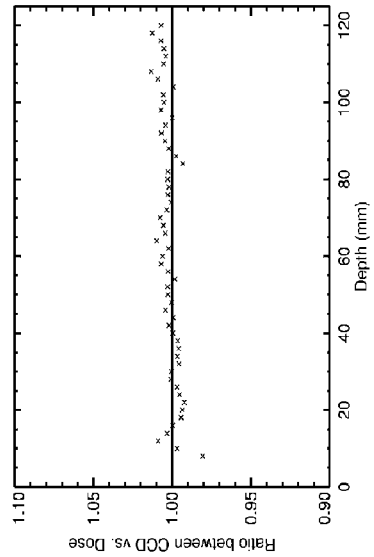
FIG. 7 shows PDD inside the LS material for a 5×5 cm$^2$ field where the uncorrected measured light signal is shown as the dotted curve, while the solid line represents the corrected measured light signal by the CCD camera and the dose distribution obtained from the treatment planning system is plotted as cross-hatches. On left side of figure, the PDD from 0 to 120 mm is shown; on the right side, the ratio between CCD signal and calculated dose.
Figure 7A:
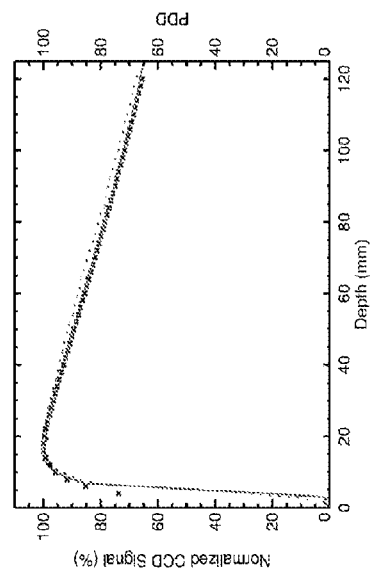

Results for the percent depth dose are shown in FIG. 7. The uncorrected light signal shows an overestimation in delivered dose with increasing depth. Correction of the light signal using the Wiener filter, however, leads to a PDD that is in agreement with results from the treatment planning system. Minor deviation in the build-up region occurs due to tank/LS interface issues. First, the acrylic tank has a 3-mm wall thickness, and no light is produced in this region. Second, because no light is produced in the tank wall, it does not spread isotropically into the LS, which is an assumption used in the blurring function, h(i,j). This leads to a steeper gradient in the light signal compared to the dose.

Verification of the Dose Distribution of a Four-Field-Box Plan

Figure 8A:
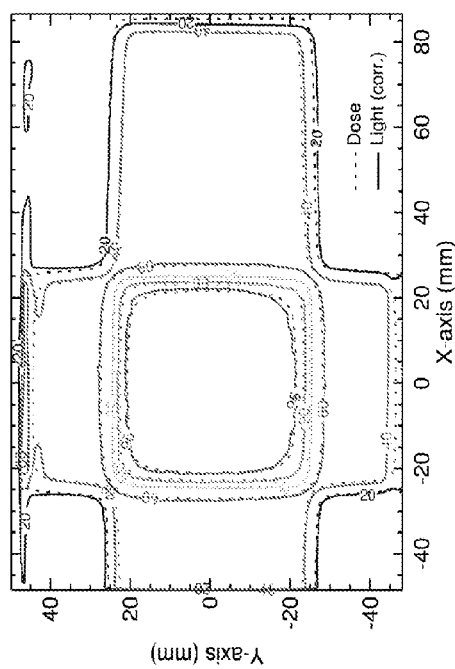
FIG. 8 provides a comparison of correct light signal to calculated 2D dose distribution of a 4-field box irradiation (top). 2D gamma index for these two distributions using a 3%/3 mm criteria is shown at the bottom (the blue color represents the regions in agreement with the above selected criteria and the red color corresponds deviations outside the criteria).
Figure 8B:
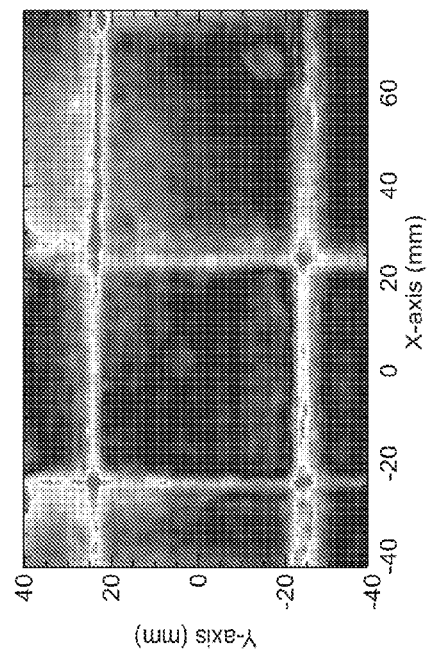

Comparison of the summation of the four corrected light fields with the dose distribution calculated with the treatment planning system shows excellent agreement throughout both the high and low dose regions (FIG. 8$a$). A gamma index (3%, 3 mm) was calculated and an agreement for 96% was found for pixels within the central part of the 2D distributions (see FIG. 8$b$). The exception occurs at the top surface of the LS, which has an interface with air. This is due to total internal reflection, which is caused by scattered light that intersects the LS/air boundary surface by angles larger than the critical angle for this interface. The good agreement shows again that measurement of the composite dose distribution from multiple field irradiations is possible, as was demonstrated above. This example also demonstrates the utility of the LS system as a quality assurance device.

The results of the study of Example 1 showed that the light emitted by a liquid scintillator (LS) under high-energy photon beam irradiation can be filtered to produce 2D dose distributions in agreement with those produced by a treatment planning system. The light signal produced by the LS was slightly distorted by isotropic light scattering within the liquid as well as refraction and reflection at the tank interface. The response of the detector system was also found to be dose rate independent.

One of the advantages of this system is that the LS material is nearly water equivalent. The mass energy absorption coefficients and the mass attenuation coefficients of the LS are within 2% of that of water for energies between 0.15 MeV to 6 MeV. Kirov et al. have developed much better LS solutions that are more water-equivalent in the megavoltage radiotherapy range than BC-531 or other commercially available LS solutions. A. S. Kirov, S. Shrinivas, C. Hurlbut, J. F. Dempsey, W. R. Binns, J. L. Poblete, *New Water Equivalent Liquid Scintillation Solutions For* 3*D Dosimetry*, Med. Phys. 27, 1156-1164 (2000). For instance, some of their novel LS solutions have densities close to 0.95 g/cm$^3$, which also make them ideal candidates for use as both detecting and phantom materials. Unlike most other detector systems (e.g., ionization chambers or film), the LS itself is used as both the detector and phantom material, avoiding perturbation by the detector.

In IMRT, the most commonly used photon beam energy is a 6 MV. We have therefore used this beam energy to validate our LSD system. However, other beam energies can be used, e.g., $^{60}$Co or 18-MV photons. The latter will produce more Čerenkov radiation, which consequently needs to be accounted for.

Although our main focus in developing the LS detector system was for future application to patient-specific QA, one could easily imagine application to dose measurement during beam commissioning or annual QA checks. The number of MUs required to obtain a single image with the LS system are few, and further, lateral profiles and PDDs can be obtained simultaneously. Thus, acquisition of beam data could be performed in a fraction of the time it takes when a single ionization chamber is used. Further, the high-resolution image is comparable to that obtained with a a-Si flat panel detector.

One pre-condition for reliable QA measurements is the reproducibility of the background images provided by the CCD camera. For this system, we found a 0.4% variability for acquisition times of 25 seconds, which demonstrates the stability of the background and thus also of the acquired image during irradiation. However, with longer acquisition times (around 10 seconds), some single pixels (about 1000 of 326, 000) showed a "salt noise" pattern, which was visible in both the background image and the images acquired during irradiation. R. C. Gonzalez and R. E. Woods, *Digital Image Processing*, 2nd Ed., (Prentice-Hall, N.J., 2002) The intensity of this noise increased with increasing acquisition time but this noise was removed by applying the median filter, as is the radiation noise. Other image distortions arise from stray radiation from the treatment head and photon interactions within the LS that strike the CCD chip. The probability of such interactions increases with the number of delivered MUs. However, shorter acquisition times are ideal for IMRT QA, which limits the amount of noise. For prolonged irradiations, one may choose to acquire multiple images and apply an adaptive median filter that removes this noise while conserving the high spatial resolution of the LS detector. Nevertheless, corrections for this source or type of noise are possible. L Archambault, T. M. Briere, A. S. Beddar, *Transient Noise Characterization And Filtration In CCD Cameras Exposed To Stray Radiation From A Medical Linear Accelerator*, Med. Phys. 35, 4342-4351 (2008).

The CCD camera is also equipped with an internal electron magnification apparatus/algorith that allows amplification of the light signal at the cost of a slightly higher noise. This is particularly useful for very low dose irradiations, where very little light is produced. However, because the CCD chip is already quite sensitive, this feature was not utilized in the present study. In low light conditions, the camera objective aperture could also be increased, which would result in a higher CCD signal but with degradation of the depth of field. If photons are created outside the depth of field then they will add an additional blurring of the image. To avoid this, all measurements were performed with a rather high F-number (F=8). Using an optical geometry formula, one can show that for a pixel size of 10 μm, a numerical aperture of 8, a focal length of f=25 mm and an object distance of 55 cm, the depth of field is equal to 7.5 cm. This is a reasonable value considering our phantom size, as well as the size of the irradiated fields. The depth of field can be easily expanded by increasing the distance to the object, and this is planned in a new phantom design. The new design will also have a FOV of about 20×20 cm$^2$, which is larger than the one used in this work. In addition, light refracted at the LS/wall and the LS/air interface also adds blurring to the image. In this preliminary work we do not correct for this effect. A possible solution could be a collimator grid or a special lens system. A. S. Kirov, J. Z. Piao, N. K. Mathur, T. R. Miller, S. Devic, S. Trichter, M. Zaider, C. G. Soares, and T. LoSasso, *The Three-Dimensional Scintillation Dosimetry Method: Test For A 106Ru Eye Plaque Applicator*, Phys. Med. Biol. 50, 3063-3081 (2005).

Background due to Čerenkov radiation was not explicitly accounted for in the present study. The amount of Čerenkov light depends on the photon energy as well as the index of refraction of the irradiated media. Because the propagation of light due to Čerenkov radiation is forward peaked, the initial direction of the particle is important. In addition, Kirov et al.[9] showed that, when the detector is placed at 90 degrees with respect to the photon beam, which is the case in our setup, the contribution from Čerenkov light is expected to be only few percent. Further evaluation of the specific scintillation solution will allow for an accurate correction of the Čerenkov effect.

Finally, the system of Example 1 can only acquire images in two dimensions, and there is no information as to the distance between the light source and the camera. However, this may be solved by adding a second CCD camera with an orthogonal view whose image acquisition is simultaneously triggered with the first camera. By combining the image data one can extract the information of the real-time position of the dose deposition if the MLC segment has only one open area (i.e., the field is contiguous). This is particularly true in proton pencil-beam scanning where the proton beam is swept over the irradiation area and its position can be easily detected.

Example 2

Materials and Methods

The detector system was developed in-house and consisted of a rectangular light-tight gray PVC phantom containing an acrylic tank filled with LS and a CCD camera as shown in FIG. 9. The organic LS material used in this study was BC-531 (Saint Gobain Crystals, Newbury, Ohio, USA). The physical characteristics of this material are shown in Table 3.

TABLE 3

Physical characteristics of the Liquid Scintillator BC-531 compared to the BC-400 plastic scintillator, polystyrene and water.

|  | BC-531 | BC-400 | Polystyrene | Water |
|---|---|---|---|---|
| Emission (% of anthracene) | 59 | 65 | N/A | N/A |
| Peak wavelength (nm) | 425 | 423 | N/A | N/A |
| Electron density (10$^{23}$ e/g) | 2.930 | 3.272 | 3.238 | 3.343 |
| Specific gravity (g/cm$^3$) | 0.870 | 1.032 | 1.060 | 1 |
| Composition [Z:fraction by weight (%)] | 1:11.98 6:88.02 | 1:8.470 6:91.53 | 1:7.740 6:92.26 | 1:11.19 8:88.81 |

The BC-531 LS light yield emission is compared to anthracene, an organic crystal commonly used as the standard for scintillators. Comparison of the LS with water, polystyrene and the most standard plastic scintillator (BC-400) illustrates its near water-equivalence. The water equivalent thickness of the LS was measured to be 0.87, which means that its water equivalent thickness scales linearly with its specific gravity. When irradiated with particles with low linear energy transfer ("LET"), a liquid scintillator will emit light in proportion to the dose delivered. For particles with higher LET such as protons, the scintillation process can be quenched, which results in an under-response of the scintillator. For a proton beam, the LET is a function of the proton energy distribution, which varies with depth. Therefore, the quenching will be more visible in the vicinity of the Bragg peak where the LET is at the highest. In general, we can assume that the LET is uniform in a plane perpendicular to the beam direction at any given depth. It is also known that for either low or high LET particles, the light output produced through the scintillation process is proportional to the beam intensity.

The volume of the LS tank was 7×7 cm$^2$ and its depth was 16 cm. The CCD camera was a high sensitivity CCD (Luca EM CCD, Andor Technologies, South Windsor, Conn., USA) with 658×496 pixels. Although this camera model is capable of amplification through electron multiplication, this feature was not used in the current work and the camera was operated as a normal CCD. The pixels were digitized at 14 bits, thus providing 16,383 grey scale levels that allowed for a large dynamic range for image processing. An objective lens (JML Optical Industries, Rochester, N.Y., USA) was mounted on the camera to produce the image. The distance between the center LS and the CCD was 53.5 cm. At this distance the field of view of the system was 12.5×9.4 cm$^2$. We used acquisition times of 100 ms and 50 ms per image. To minimize the time between image acquisitions, the camera was operated in frame transfer acquisition mode. During a frame transfer acquisition, an image is acquired in the light sensitive area of the CCD then rapidly transferred to a storage area shielded from light. Then a second image is acquired in the light sensitive area while, at the same time, the data in the storage area is read. Therefore, the time gap between two consecutive images is equal to the time required to transfer an image from the light sensitive area to the storage area. This time gap is equal to 0.3 ms and therefore required no correction.

Image processing is required before extracting quantitative information from images acquired during the irradiation. First, a series of the dark images acquired before the irradiation is averaged and is subsequently subtracted from the images acquired during the irradiation. This step is important to make sure that the background on all data images is zeroed.

Typically, every pixel has an offset of about 500 gray scale levels. Furthermore, subtracting the dark images also corrects for stray light that may have entered the phantom, but only if that stray light is also present at the time of irradiation. Subtracting background images cannot correct for background contribution from scattered scintillation light (see Sec. V B for a discussion on the impact of scattered light). Further image processing is necessary if the amount of radiation induced noise on the CCD chip is large. Stray radiation, mostly photons and neutrons, directly incident on the CCD chip may produce noise in the form of sharp spikes. With our current setup, we have found this noise to be of a relatively low level (less than 100 events per image frame). Therefore, data presented for a single image frame were not processed to remove those spikes because it was always possible to find a line of pixels free from radiation spike noise. For data acquired over a longer period (e.g., 100 MU), a median based filter was used as is often done in such cases. J. Barkhof, G. Schut, J. B. Flanz, M. Goiten and J. M. Schippers, *Verification of Alignment of a Therapeutic Radiation Beam Relative to its Patient Positioner*, Med. Phys. 26, 2429-24-37 (1999). Images were combined with the median operation as suggested from our recent work on the impact of stray radiation from linac on CCD cameras. L. Archambault, T. M. Briere and S. Beddar, *Transient Noise Characterization And Filtration In CCD Cameras Exposed To Stray Radiation From A Medical Linear Accelerator*, Med. Phys. 35, 4342-51 (2008).

The proton irradiation experiments were conducted at the M. D. Anderson Cancer Center's Proton Therapy Center to assess the feasibility of using a LS detector system for scanning proton beam dosimetry. Proton measurements of dose distributions produced by a 120 MeV passively scattered proton beam with a field size of 2×2 cm² (to approximate a pencil beam from a passive scattering system, although a real pencil beam will be much smaller) were produced inside the LS detector. The nominal beam penetration in water was 5 cm.

Measurements were also performed in water with ion chambers for the same proton beam as the one used on the LS system. The depth of measurements with the ion chamber was corrected to account for the different densities between the LS and water. Depth dose curves were measured with an Advanced Markus® plane parallel ion chamber model N34045 (PTW, Freiburg, Germany) with a sensitive volume radius of 2.5 mm, a thickness of 1 mm, and a total volume of 0.02 cm³. Lateral profiles were measured with a 0.015 cm³ PTW 31006 Pinpoint ionization chamber (an inner radius of 1 mm, a length of 5 mm, and a total sensitive volume of 0.015 cm³).

GEANT 4.9.1 Monte Carlo toolkit was used to verify the feasibility of using Monte Carlo techniques to model the response of the LS system irradiated by proton beams. A simple proton beam was directed toward a cubic volume of liquid scintillator. The beam-energy spectrum was Gaussian and its mean and standard deviation were adjusted to reproduce depth dose curves measured with ion chamber. We have shown in an earlier work that quenching can be accounted for in Monte Carlo simulations by including the two parameter Birks function. L. Archambault, J. C. Polf, L. Beaulieu, and S. Beddar, *Characterizing The Response Of Miniature Scintillation Detectors When Irradiated With Proton Beams*, Physics in Medicine and Biology 53, 1865-76 (2008). The same quenching model was used in these simulations. Moreover, GEANT4 can produce and track scintillation photons. By combining the quenching with the tracking of scintillation photon, it was possible to simulate the light distribution seen by the CCD camera.

Theoretical Evaluation of Light Collection and Detector Signal

The purpose of the objective lens is to collect scintillation light produced in the 3D liquid scintillator volume and to form an image on the CCD chip. The overall performance of the LSD system will depend on the properties of the lens and the sensitivity of the CCD. In this section, we perform a theoretical evaluation of the system parameters.

One of the main differences in imaging a three-dimensional volume instead of a two-dimensional plane is that the image focus must be preserved over the entire width of the irradiated volume in order to produce a sharp image. The region, or depth, over which the image is on focus, is called depth of field (DOF). If an object placed in front of a lens at a distance $d_o$ produces an image on focus at a distance $d_i$ behind the lens, then any displacement of the object ($d_o \pm \Delta x$) will results in a blurred image at position $d_i$. Blurring means that a point in the object will be spread and will become a disk on the image. This disk of diameter c is sometimes referred to as the circle of confusion. The value of c is zero at the focal plane and increase with increasing distance from that plane. Most imaging system can tolerate certain non-zero values of c without noticeable effect. The value of c will have an impact on the spatial resolution of the imaging system. The distance over which c is within tolerable limits defines the depth of field. With geometric optics, it is possible to describe the proximal, $d_p$, and distal, $d_d$, distances of the DOF (for example, see R. Kingslake. *Optics In Photography*, SPIE Publications, June 1992)

$$d_p = \frac{d_o \cdot f^2}{f^2 + F \cdot c \cdot (d_o - f)}, \qquad (1)$$

$$d_d = \frac{d_o \cdot f^2}{f^2 - F \cdot c \cdot (d_o - f)}$$

Where F is the f-number of the objective lens (i.e., the ratio of the focal length, $f$, and the lens diameter). In the setup used, the object distance was 53.5 cm (i.e., the middle of the liquid scintillator tank) and the focal length was 2.5 cm. For a digital, pixilated imager such as a CCD camera it is common practice to set the value of c as the size of one CCD pixel (10×10 µm²). Then, we can determine the length of the DOF for different values of F. The f-number can be adjusted experimentally by opening or closing an iris. In our setup, an f-number of 1.4 was used which resulted in a DOF length of 1.7 cm.

The signal magnitude of a pixel depends on three factors: (1) the number of scintillation photon produced; (2) the optical coupling efficiency of the optical system (i.e., the probability that a scintillation photon will reach the photosensitive CCD); (3) the conversion of that scintillation photon into a grey scale level. Before evaluating the signal magnitude in the 3D case, let's first consider a 2D system such as described by Boon et al., *Fast 2D Phantom Dosimetry For Scanning Proton Beams*, Medical Physics 25, 464-75 (1998). Let's assume that all the scintillation light is produced in a given plane of thickness 4× at a fixed distance from the objective lens. The number of scintillation photons, $N_\gamma$, produced in that plane in a region corresponding to one pixel of the CCD after receiving a dose D is defined as:

$$N_\gamma(\lambda) = A_p \cdot \Delta x \cdot \rho \cdot D \cdot S(\lambda) \cdot Q \quad (2)$$

Where $A_p$ is the surface area of the pixel and $\rho$ is the mass density. The first product ($A_p \times \Delta x \times \rho$) is the mass of the emitting volume. The scintillation efficiency, $S(\lambda)$, is described in terms of the number of scintillation photons emitted at a wavelength $\lambda$ per unit of energy deposited and can be obtained from the scintillator manufacturer. The quenching term, Q, represents the under-response of the liquid scintillator and is function of the stopping power of the proton beam. Only a small fraction of $N_Y$ will reach the CCD camera. Assuming that every irradiated point in the liquid scintillator acts as an isotropic light source, the optical coupling efficiency, $\epsilon$, can be described with a well-known equation:

$$\varepsilon = \frac{Tm^2}{16F^2(1+m)^2 n_s^2} \quad (3)$$

where T is the transmission of the lens, m is the magnification factor and $n_s$ is the refractive index of the scintillator. T. Yu, J. M. Boone, *Lens Coupling Efficiency: Derivation And Application Under Differing Geometrical Assumptions*, Med. Phys. 24, 565-70 (1997). Equation (3) neglects the loss of scintillation photons due to absorption, Rayleigh scattering or vignetting for pixels far from the central axis. Finally, the resulting pixel value, I, in grey scale levels is given by:

$$I = \frac{N_\gamma(\lambda) \cdot \varepsilon \cdot \eta(\lambda)}{N_{e-}} \quad (4)$$

where $\eta(\lambda)$ is the CCD quantum efficiency and $N_{e-}$ is the number of photoelectron per grey scale level. If the depth of field covers the whole radiation beam, the entire irradiated volume of the liquid scintillator will be on focus. In that case, one can approximate the 3D case as a sum of 2D planes with different distances, x, from the objective lens. However, varying x affects the pixel size ($A_p$) and the magnification (m) and equations (2) and (3) must be re-written accordingly:

$$I = \int_{x_1}^{x_2} \left(\frac{x \cdot h_i}{d_i}\right)^2 \cdot dx \cdot \rho \cdot D \cdot S(\lambda) \cdot Q \cdot \frac{T \cdot (d_i/x)^2}{16 \cdot F^2 \cdot (1+d_i/x)^2 \cdot n_s^2} \cdot \frac{\eta(\lambda)}{N_{e-}} \quad (5)$$

where $h_i$ is the image height. With a CCD camera, $d_i$ is the fixed distance between the objective lens and the CCD chip and $h_i$ is the size of the CCD chip. If the DOF is not sufficient to cover the whole irradiated volume, the light that is out of focus will also contribute to I. However, we aim at using a DOF larger than the irradiated volume.

Experimental Results

Figure 10:
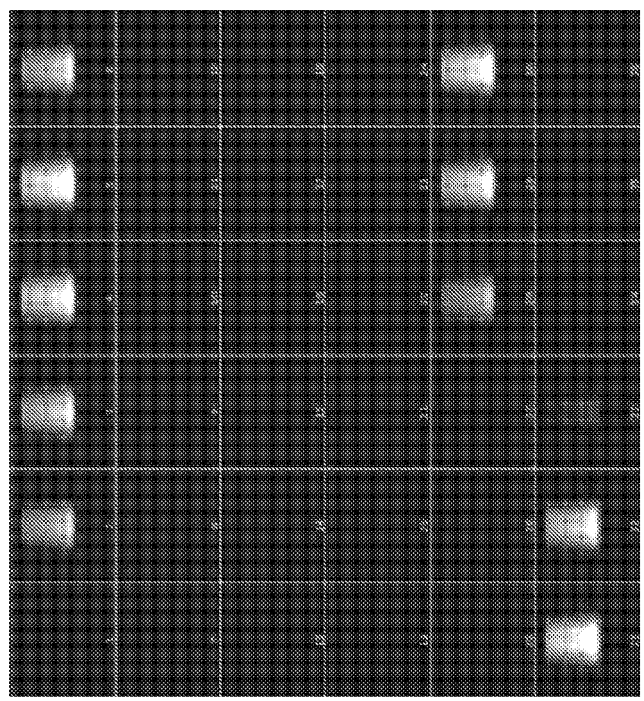
FIG. 10 is a consecutive series of images of the LS detector system exposed to a 120 MeV proton beam where each image represents the total light output seen within a 100 ms time interval.

FIG. 10 shows a 35 image series obtained from a continuous CCD acquisition of multiple frames acquired during one single continuous proton irradiation. Each frame corresponds to a 100 ms time acquisition interval. A total of 100 MU where delivered at a dose rate of 150 MU/min for this series of data acquisition. 1 MU corresponds to 2.7 cGy for this setup. This means that each image received 0.25 MU. Two consecutive proton pulses (first pulse: frames 2-6, second pulse: frames 28-32) can be seen in FIG. 10, separated by 20 frames of dark images (frames 7-27). This corresponds exactly to the programmed proton pulse from the Hitachi synchrocyclotron (0.5 second pulse, with a 2 s repetition time). The dose deposition that is characteristic of the proton beam Bragg Peak can be clearly seen in frames 3-5 in the first pulse.

Analysis of the measured light distribution can be performed either by combining all images acquired over a given number of MU or on an image-per-image basis. FIG. 3 shows a depth profile of the measured light profile for single images acquired over 100 and 50 ms. The instantaneous dose rate during each proton pulse is approximately equal to 800 cGy/min, corresponding to a maximum dose per frame of 1.3 cGy and 0.67 cGy for acquisition times of 100 ms and 50 ms, respectively. From FIG. 11, we can see that the signal obtained from an integration time of 50 ms (0.67 cGy) is more than sufficient for these measurements. The standard deviation of the measurements at the depth of 2 cm in the center of the field is 0.7% and 1.1% for the 100 ms and 50 ms, respectively. Smoother curves could be obtained at the expense of spatial resolution by averaging the signal over consecutive pixels. It is possible to compare pixel values measured in this experiment with the predictions from equation (5). For a dose of 0.67 cGy (50 ms integration time) with the experimental conditions described above, we measured an average pixel value of $6.1 \times 10^3$ grey scale levels at the Bragg peak after subtracting the background image. For the same experimental setup, assuming a quenching factor of 0.77 (as depicted in FIG. 12) and assuming that all scintillation photons are emitted at the peak wavelength for which the CCD camera has a quantum efficiency of 50%, equation (5) predicts $5.3 \times 10^3$ grey scale levels. This agreement is excellent considering that equation (5) was derived from first principles. In addition to the approximation made while deriving equation (5), other factors may explain the difference between the measured and theoretical values: (1) Equation (5) was integrated over the 2 cm nominal field size, therefore neglecting the penumbra of the beam; (2) light scattering on the walls of the phantom may artificially raise the measured pixel value (see section V.B); (3) uncertainty in the data provided by the various manufacturers.

The pixel value at the Bragg peak for integration times of 50 ms (0.67 cGy) and 100 ms (1.3 cGy) were $6.1 \times 10^3$ and $1.2 \times 10^4$ grey scale levels, respectively. Both are well within the dynamic range of the camera, but the image acquired with 1.3 cGy takes full advantage of the dynamic range with some room for higher doses. With this setup, a dose variation of 1% would cover 610 or 1220 grey scale levels for the short and long acquisition time, respectively. In both cases a 1% dose variation would be detectable.

Figure 11:
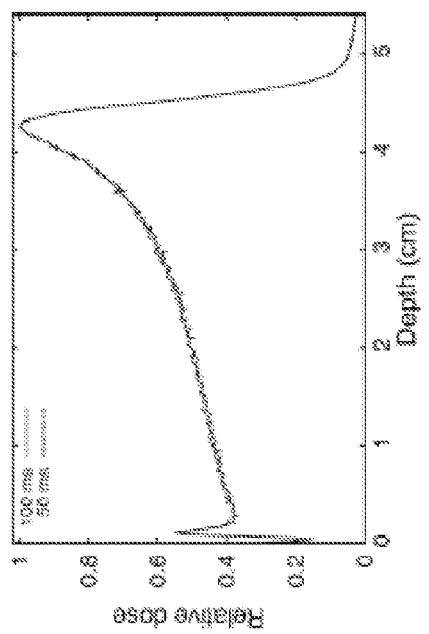
FIG. 11 is a depth dose curve measured from single images with acquisition times of 100 ms and 50 ms.
Figure 12:
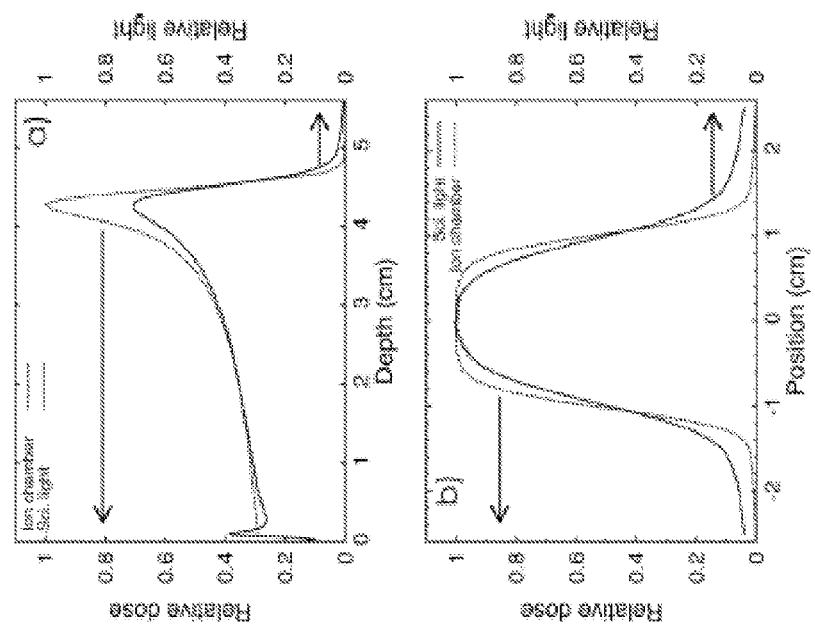
FIG. 12(a) is a depth dose curve measured with the LS detector system and compared to ion chamber measurements (Advance Markus chamber perpendicular to the beam direction).
FIG. 12(b) shows profiles taken at 2 cm depth with the LS detector system and compared to ion chamber measurements (Pinpoint ionization chamber) where all measurements were averaged over an acquisition period of 100 MU.
Figure 13:
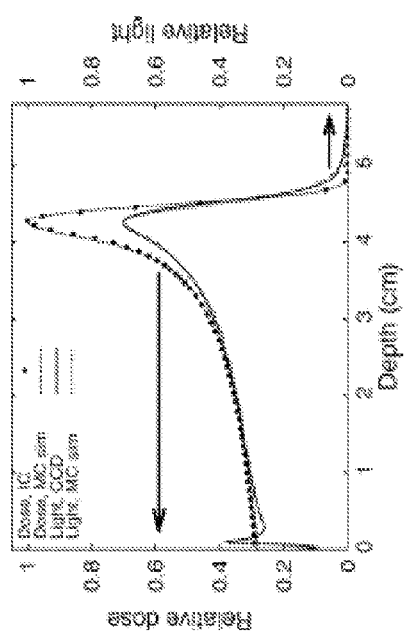
FIG. 13 provides a depth dose curve measured with the LS detector with and without correction for quenching compared with the ion chamber measurements. (All the curves were normalized at 2.0 cm).

The scintillation light distribution profile as a function of depth, as shown in FIG. 11, has a shape roughly similar to the shape of the dose distribution of a Bragg peak. However there are some important differences between the light distribution and the dose distribution that need to be noted. To better illustrate these differences, FIG. 12(*a*) shows a depth profile of the light distribution integrated over 100 MU compared to the depth dose as measured with the Markus chamber. FIG. 12(*b*) shows a lateral profile of the light distribution integrated over 100 MU compared to the pinpoint ion chamber lateral dose profile measured at a depth of 2 cm. Both curves were normalized at that depth (2 cm depth). There are several reasons for the differences between the dose and light profiles: (1) the ion chamber measured dose in a relatively small area of integration (i.e., the chamber sensitive volume) while the light distribution measured with CCD camera is the sum of all the light produced along the depth of field [see Eq. (5)]; (2) the light distribution is blurred because of scattering and other optical phenomena such as total internal reflection, which produce the artifacts at the surface of the liquid; (3) the quenching of the scintillator near the Bragg peak.

As mentioned above, scintillation detectors are sensitive to the stopping power of the incident particle. While this is not sufficient to affect scintillators linearity for photon and electron beams, it can cause an underestimation of the dose in the vicinity of a proton Bragg peak. A. S. Beddar, T. R. Mackie, and F. H. Attix, *Water-Equivalent Plastic Scintillation Detectors For High-Energy Beam Dosimetry: I. Physical Characteristics And Theoretical Consideration*, Physics in Medicine and Biology 37, 1883-900 (1992); A. S. Beddar, T. R. Mackie, and F. H. Attix, *Water-Equivalent Plastic Scintillation Detectors For High-Energy Beam Dosimetry: II*. Properties And Measurements, Physics in Medicine and Biology 37, 1901-13 (1992); L. Archambault, A. S. Beddar, L. Gingras, R. Roy, and L. Beaulieu, *Measurement Accuracy And Cerenkov Removal For High Performance, High Spatial Resolution Scintillation Dosimetry*, Medical Physics 33, 128-35 (2006); A. S. Beddar, *Water Equivalent Plastic Scintillation Detectors In Radiation Therapy*, Radiation Protection Dosimetry 120, 1-6 (2006). This quenching effect due to the changing LET of the incoming particle beam also needs to be corrected.

In theory, to detemrine the exact quenching correction factor, one would need to know the exact energy spectrum of the proton beam at any given point. However, some assumption can be made to simplify the process. As mentioned previously, we can assume the stopping power to be constant in a plane perpendicular to the beam direction. It is also possible to take advantage of the fact that, with the LS system, we are always using the same geometry. The proton beam leaving the nozzle is always incident on the same uniform and homogeneous tank of liquid scintillator. Consequently with the LS system, the quenching correction should always be the same for a given beam energy and beam-energy spread at a given depth. This would not be the case if there were heterogeneities in the beam path because phenomena such as distal edge degradation would change the proton energy spectrum. Therefore, quenching corrections can be performed by computing tables of correction factors that would depend on the depth and on the nominal energy of the beam.

Comparison of the ion chamber dose distribution, the measured light distribution, and the Monte Carlo simulation of both light and dose distribution is shown in FIG. 5. Even with a simple beam model, there is good agreement between simulations and measurements. This indicates that Monte Carlo simulations could be used to define quenching correction factors. We plan to refine the model in future work by expanding our simulations and measurements to a large number of clinical beam energies.

Spatial Resolution

The spatial resolution of the LS detector system is determined by two factors: the blurring of the image due to light diffusion and the discrete nature of the pixels. As FIG. 12-b shows, the light profile is blurred compared to the actual dose profile. Even if the images were to contain no blurring, the spatial resolution would still be limited by the pixel size. The smaller the pixel size is, the better the spatial resolution would be. Interpolating between pixel values can result in a better spatial resolution than the pixel size. The field of view and the spatial resolution are both linearly dependent on the distance between the CCD and the LS detector. Increasing the distance between the camera and the LS detector can increase the field of view, but will increase the pixel size. With our current setup with a distance of 50 cm between the scintillator and the CCD, each pixel covers an area of $0.19 \times 0.19$ mm$^2$ of the LS, thus resulting in a field of view of $12.5 \times 9.4$ cm$^2$. Increasing the LS-CCD distance to 100 cm would result in a field of view of $25 \times 19$ cm$^2$ and a pixel size of 0.38 mm in both directions, which would be adequate for the energies and field sizes encountered in proton therapy.

Theoretical calculations (as provided above) showed that the depth of field for our setup was 1.7 cm, which is slightly shorter than the size of the radiation beam (2 cm$\times$2 cm). This explains in part the amount of blurring seen in FIG. 12. However, even with a larger DOF, blurring would still be present because of light scattering (see next section). There are two possible ways to account for blurring in our setup. The first technique to account for the blurring would be to perform a deconvolution of the blurred image. This could be performed in order to convert the light profile into the real dose distribution. The second technique to account for the blurring is to make a forward projection of the dose distribution to predict what the light distribution should look like. The deconvolution approach is interesting because it would allow direct comparison with the dose distributions such as the ones provided by a treatment planning system. However, the deconvolution process is a delicate procedure requiring a fine adjustment of several parameters to minimize the risk of systematic errors. Both the deconvolution approach and the forward projection will be tested in our future work.

Image Artifacts and Corrections

Light Propagation (Scattering and Absorption

Even though the liquid scintillator is transparent to the light it produces, some absorption might occur and diffusion by Rayleigh scattering results in a light distribution that is blurred. In addition to this, some light is reflected on the walls of the LS tank and causes the background level to be non-zero. This effect is especially strong with the current prototype because of its narrow cross-section (i.e., only 7 cm$\times$7 cm wide) and the color of its wall material (i.e., gray). The walls of the tank should be black in color and grainy in texture to reduce this source of artifact to negligible levels. Blurring is most visible in the tail of the depth dose curve (see FIG. 12a) and in the wide penumbral width (see FIG. 12b). The band of light seen at the surface of the LS is due to total internal reflection at the LS-air interface, and is heightened by the meniscus at the surface of the LS (see FIG. 12a).

Vignetting:

Vignetting is characterized by a reduction in light intensity in the periphery of an image caused by geometrical factors ranging from the inverse square law to mechanical blocking of incident light rays by the frame enclosing the lenses. Obliquely incident light "sees" a smaller lens opening than does light approaching perpendicularly to the lens. In our current setup, the small proton field only occupied the middle of the image and was therefore only slightly affected by vignetting (less than 2% on the field edges). However, because of the relatively short distance between the objective lens and the LS tank, we can expect vignetting to have an effect on the LSD system if a large LS tank and larger field size are used. With our CCD camera and objective lens, vignetting can reach up to 10% in the periphery of the image. If necessary, we can correct vignetting by acquiring a uniform image (e.g., a white screen) and then using this image to correct subsequent images.

Parallax:

A 3D object projected on a 2D plane can cause parallax artifacts because of the perspective view. Because of this, sizes of objects seen on the image depend on their distances from the objective lens. This effect was partially taken into account in equation (D) by having m and Ap vary as a function of the distance to the objective lens. However to fully correct for parallax, it is necessary to use a second point of view (i.e., we need to image the phantom with two cameras).

Several steps are required to convert the light distribution into a dose distribution. Our next prototype will be larger and would have walls made of a darker and grainier (non-reflecting) material in order to reduce the intensity of the background signal. The surface effect can be corrected by placing a thin (<1 mm) light-absorbing sheet on top of the surface of the LS. In addition to an improved prototype design, we measure or estimate the point spread function of our imaging system in order to de-convolve the blurred light distribution and restore the sharpness of the dose distribution.

IMPT Applications

For an active pencil beam delivery, the dose is delivered through a large number (e.g., thousands) of a few millimeter-sized discrete proton spots of varying energies and intensities, which sum up to the desired dose distribution. In IMPT, a single spot from our scanning beam system can be delivered with doses as low as 0.005 MU to doses as high as 0.04 MU. However the definition of a Monitor Unit with this scanning beam system is different from the usual convention used in photon therapy (1 MU corresponds to 1 cGy at $d_{max}$). For our scanning beam at our facility, one MU is defined as the dose in the middle of a 10 cm spread-out Bragg peak for a field of 10 cm×10 cm with a maximum range of 30.6 cm in water. We measured that the dose at the Bragg peak for a single proton spot can vary from 1.5 cGy to 10 cGy. This means that even if the number of monitor units per spot seems low, the dose delivered in a single spot is of the same magnitude as the dose that was measured in a single frame with our passive scattering experiment. Therefore, the signal intensity will be sufficiently high to be measured by our system.

For the QA of IMPT fields, a second CCD camera orthogonal to the first one will be used to acquire images simultaneously. Both cameras should also be synchronized with the beam delivery system. Using such a method, images of every proton pencil beam can be viewed at two different angles, which can be used to determine the exact three-dimensional position of the pencil beam and its depth in a single irradiation beam delivery. This spatial information will complement the dose information obtained by the quantitative assessment of the amount of scintillation light produced by the beam. For the QA of IMPT beams, it is expected that the LS detector system will determine the position, integrated intensity at each position and range (energy) of each pencil beam incident on the LS detector phantom.

Because an IMPT treatment is the sum of a series of nearly monoenergetic beams, quenching could be corrected by applying a depth dependent correction factor specific to the beam's nominal energy. These correction factors can be determined either by measurements or, as mentioned earlier, by Monte Carlo simulations as shown in our previous work.

The invention claimed is:

1. A liquid scintillator detector for three-dimensional dosimetric measurement of a radiation beam comprising: a substantially transparent three-dimensional volumetric phantom liquid scintillator; and at least two cameras, wherein the three-dimensional volumetric phantom liquid scintillator is exposed to the radiation beam to produce light that is simultaneously captured by the cameras that provide a three-dimensional image of the beam.

2. The liquid scintillator detector of claim 1, wherein the image is further processed to create three-dimensional dosage distributions.

3. The liquid scintillator detector of claim 1, wherein one of the cameras is disposed orthogonally to the other.

4. The liquid scintillator of claim 1, wherein the volumetric phantom comprises at least 125 cm3 of liquid scintillator.

5. The liquid scintillator detector of claim 1, wherein the at least two cameras are high-speed CCD cameras.

* * * * *